(12) United States Patent
Kang

(10) Patent No.: US 10,615,601 B2
(45) Date of Patent: Apr. 7, 2020

(54) SHIP AND POWER MANAGING METHOD OF THE SAME

(71) Applicant: SAMSUNG HEAVY INDUSTRIES CO., LTD., Seoul (KR)

(72) Inventor: Yun Tae Kang, Gyeongsangnam-do (KR)

(73) Assignee: SAMSUNG HEAVY INDUSTRIES CO., LTD., Seoul (KR)

( * ) Notice: Subject to any disclaimer, the term of this patent is extended or adjusted under 35 U.S.C. 154(b) by 207 days.

(21) Appl. No.: 15/573,396

(22) PCT Filed: Jun. 12, 2015

(86) PCT No.: PCT/KR2015/005923
§ 371 (c)(1),
(2) Date: Nov. 10, 2017

(87) PCT Pub. No.: WO2016/182115
PCT Pub. Date: Nov. 17, 2016

(65) Prior Publication Data
US 2018/0159330 A1   Jun. 7, 2018

(30) Foreign Application Priority Data

May 13, 2015   (KR) .................. 10-2015-0066567
May 13, 2015   (KR) .................. 10-2015-0066571

(51) Int. Cl.
*H02P 9/04*  (2006.01)
*H02J 3/32*  (2006.01)
(Continued)

(52) U.S. Cl.
CPC ............... *H02J 3/32* (2013.01); *B63J 99/00* (2013.01); *H02J 3/38* (2013.01); *H02J 9/00* (2013.01); *B63B 79/00* (2020.01)

(58) Field of Classification Search
CPC ........ B63J 99/00; B63J 2099/008; H02J 3/38; H02J 3/32; H02J 9/00
See application file for complete search history.

(56) References Cited

U.S. PATENT DOCUMENTS 6,664,653 B1    12/2003  Edelman
2003/0151259 A1*  8/2003  Feddersen ............. F03D 7/0224
                                                          290/44
(Continued)

FOREIGN PATENT DOCUMENTS

JP   2010141998 A     6/2010
JP   2010-241160 A   10/2010
(Continued)

OTHER PUBLICATIONS

European Intellectual Property Office, European Search Report and Written Opinion for European Application No. 15891931.6, dated Sep. 27, 2018, 64 total pages.

(Continued)

*Primary Examiner* — Alfonso Perez Borroto
*Assistant Examiner* — Esayas G Yeshaw
(74) *Attorney, Agent, or Firm* — SoCal IP Law Group LLP; Mark A. Goldstein

(57) ABSTRACT

Provided are a ship and a power management method of the ship. The ship comprises: a power grid; at least one generator that is connected to the power grid and supplies electricity to the power grid; a high-capacity battery connected to the power grid, and charged by receiving the electricity from the power grid or discharged to supply power to the power grid; a plurality of load components connected to the power grid; and a controller for receiving generator load information from the at least one generator, sensing a voltage of the power grid to calculate a current load and an average load, and controlling the generator to bear the (Continued)

average load and the high-capacity battery to bear a difference load between the current load and the average load.

14 Claims, 12 Drawing Sheets

(51) Int. Cl.
    *B63J 99/00*     (2009.01)
    *H02J 9/00*     (2006.01)
    *H02J 3/38*     (2006.01)
    *B63B 79/00*     (2020.01)

(56) References Cited

U.S. PATENT DOCUMENTS

| | | | | |
|---|---|---|---|---|
| 2012/0061959 A1* | 3/2012 | Yasugi | ............... | H02P 9/10 290/44 |
| 2012/0235611 A1* | 9/2012 | Kuwabara | ............... | H02M 1/08 318/400.17 |
| 2013/0277970 A1* | 10/2013 | Dange | ............... | F03D 7/026 290/44 |
| 2014/0058576 A1* | 2/2014 | Jackson | ............... | G06F 1/26 700/297 |
| 2014/0097683 A1* | 4/2014 | Piyabongkarn | ............... | H02J 3/32 307/26 |
| 2015/0322874 A1* | 11/2015 | Scuderi | ............... | G05B 15/02 700/287 |
| 2016/0359328 A1* | 12/2016 | Hunt | ............... | H02J 3/32 |

FOREIGN PATENT DOCUMENTS

| | | |
|---|---|---|
| JP | 5357526 B2 | 12/2013 |
| KR | 10-2014-0009631 A | 1/2014 |
| KR | 10-1373874 B1 | 3/2014 |
| KR | 10-1431429 B1 | 8/2014 |
| WO | 2008/011522 A2 | 1/2008 |
| WO | 2012175624 A1 | 12/2012 |
| WO | 2016-182115 A1 | 11/2016 |

OTHER PUBLICATIONS

World Intellectual Property Organization, International Search Report for international application No. PCT/KR2015/005923, dated Feb. 12, 2016, 2 pages.

European Intellectual Property Office, Search Report for European Application No. 1589131.6, dated Dec. 17, 2018, 11 pages.

* cited by examiner

SHIP AND POWER MANAGING METHOD OF THE SAME

RELATED APPLICATION INFORMATION

This patent claims priority from International PCT Patent Application No. PCT/KR2015/005923, filed Jun. 12, 2015 entitled, "SHIP AND POWER MANAGEMENT METHOD THEREOF", which claims priority to Korean Patent Application Nos. 10-2015-0066567, filed May 13, 2015, and 10-2015-0066571, filed May 13, 2015 all of which are incorporated herein by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Technical Field

The present inventive concept relates to a ship and a power management method of the ship, and more particularly, to a ship including a high-capacity battery and a power management method of the ship.

Background Art

Rechargeable secondary battery technology is gradually developing, and rechargeable secondary batteries are becoming smaller in size compared to their capacity. A secondary battery that can store and supply a large amount of electric power is called an energy storage system (ESS), and attempts are being made to commercialize the secondary battery as an auxiliary power source for a power management system.

DISCLOSURE

Technical Problem

For example, a ship performing a dynamic positioning operation uses thrusters, which are auxiliary power units, in order to maintain its balance against dynamic changes in its position and angle over time.

However, since the operation of the thrusters for the dynamic positioning operation of the ship is intended to cope with dynamic changes in the unspecified position and angle of the ship, it can cause momentary fluctuations in the load consumed or generated in the ship.

In order to cope with such momentary fluctuations in the load of the ship, generators in the ship must have a sufficient margin for the load that can be supplied. For example, in order to supply a load equal to or greater than the average load consumed in the ship, one generator should be able to supply power sufficiently greater than the average load, or an additional generator should maintain a power generation state in which it supplies a minimum load.

That is, in order to cope with momentary load fluctuations, a generator should maintain a power generation state in which it supplies a relatively low load compared to its capacity, and this can cause a reduction in the fuel efficiency of the generator.

Aspects of the inventive concept provide a ship including generators with enhanced fuel efficiency.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

Technical Solution

According to an aspect of the inventive concept, there is provided a ship including: a power grid; one or more generators which are connected to the power grid and supply electricity to the power grid; a high-capacity battery which is connected to the power grid and charged with electricity supplied from the power grid or discharged to supply power to the power grid; a plurality of load components which are connected to the power grid; and a controller which receives generator load information from the generators, calculates a current load and an average load by sensing a voltage of the power grid, and controls the generators to handle the average load and the high-capacity battery to handle a difference load between the current load and the average load.

Here, the controller controls the high-capacity battery to be discharged during a time period in which the current load is greater than the average load and controls the high-capacity battery to be charged during a time period in which the current load is smaller than the average load.

When the average load is smaller than a maximum efficiency load of one of the generators, only the generator is operated, and the other generators are not operated.

During a dynamic positioning operation of the ship, the average load is handled by the generator, and the difference load is handled by the high-capacity battery. The high-capacity battery includes a super capacitor.

The controller monitors a first deviation between an amplitude of the voltage of the power grid and a specific amplitude or a second deviation between a frequency of the voltage of the power grid and a specific frequency and further calculates a difference between the current load and a total operating load of the generators based on the first deviation or the second deviation.

The controller includes: a generator load control unit which transmits a generator control signal to the generators and receives the generator load information from the generators; a load calculation unit which receives the generator load information from the generator load control unit and calculates the average load and the current load based on the voltage of the power grid detected by a sensor; a battery control unit which transmits a battery control signal to the high-capacity battery and receives information about a current charge level of the high-capacity battery, the number of charge/discharge cycles, charge and discharge durations, etc. from the high-capacity battery; and a central control unit which controls whether each of the generators will be operated and an operating load of each of the generators by providing the generator control signal to each of the generators through the generator load control unit and controls whether the high-capacity battery will be charged or discharged by providing the battery control signal to the high-capacity battery through the battery control unit.

In addition, the controller further includes a navigation information database (DB) in which sailing schedule information of the ship is recorded, and the central control unit receives the sailing schedule information of the ship from the navigation information DB and sets an additional charging time period of the high-capacity battery.

In addition, the central control unit receives navigation information from the navigation information DB, calculates a period of time left before arrival based on the received navigation information, calculates an average load during sailing and the amount of power required for charging, calculates a charging period, which is required to fully charge the high-capacity battery when at least one of the generators are operated at the maximum efficiency load, based on the calculated average load during sailing and the calculated amount of power required for charging, and controls the additional charging of the high-capacity battery by recording the calculated charging period in the navigation information DB.

The controller sets a charging time period of the high-capacity battery based on the sailing schedule information of the ship.

According to another aspect of the inventive concept, there is provided a ship including: a power grid; first and second generators which are connected to the power grid and supply electricity to the power grid; a high-capacity battery which is connected to the power grid and charged with electricity supplied from the power grid or discharged to supply power to the power grid; a plurality of load components which are connected to the power grid; and a controller which receives generator load information from the first and second generators, calculates a current load and an average load by sensing a voltage of the power grid, and controls the first and second generators to handle the average load and the high-capacity battery to handle a difference load between the current load and the average load, wherein the controller operates the second generator when the average load is greater than a maximum efficiency load of the first generator.

When the average load is greater than the maximum efficiency load of the first generator, the controller maintains an operating load of the first generator at the maximum efficiency load of the first generator and controls the first generator and the second generator such that the sum of the operating load of the first generator and an operating load of the second generator corresponds to the average load.

When the average load is greater than the maximum efficiency load of the first generator, the controller maintains the operating load of the first generator at the maximum efficiency load of the first generator and maintains the operating load of the second generator at a maximum efficiency load of the second generator.

According to another aspect of the inventive concept, there is provided power management method of a ship, the method comprising: determining an average load and a current load based on generator load information and a voltage of a power grid; comparing the average load with a maximum efficiency load and activating an additional generator based on the comparison result; and comparing the current load with the average load and charging or discharging a high-capacity battery based on the comparison result.

Other specific aspects of the inventive concept are included in the detailed description and the drawings.

DETAILED DESCRIPTION

Mode for Invention

Figure 1:
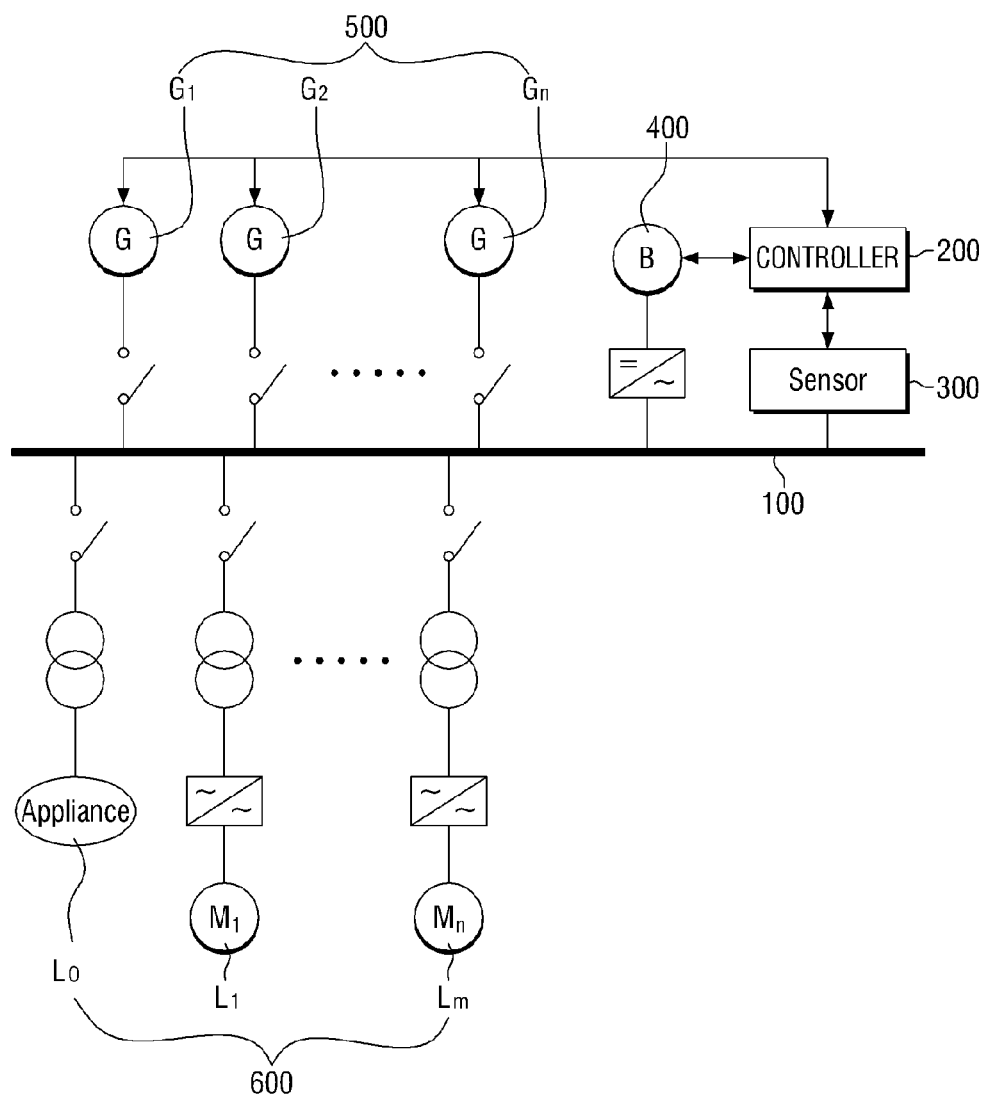
FIG. 1 is a block diagram of a power system of a ship according to an embodiment of the inventive concept.

Hereinafter, exemplary embodiments of the present inventive concept will be described in further detail with reference to the attached drawings. Advantages and features of the inventive concept and methods of accomplishing the same may be understood more readily by reference to the following detailed description of exemplary embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the invention to those skilled in the art, and the inventive concept will only be defined by the appended claims. Like reference numerals refer to like elements throughout the specification.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated elements, steps, and/or operations, but do not preclude the presence or addition of one or more other elements, steps, operations, and/or groups thereof. As used herein, the term "and/or" includes any and all combinations of one or more of the associated listed items.

Hereinafter, the inventive concept will be described in more detail with reference to the accompanying drawings.

FIG. 1 is a block diagram of a power system of a ship according to an embodiment of the inventive concept.

Referring to FIG. 1, the ship according to the embodiment of the inventive concept includes a power grid 100, a plurality of generators G1 through Gn or 500 connected to the power grid 100, a high-capacity battery 400 connected to the power grid 100, a plurality of load components 600 connected to the power grid 100, and a controller 200.

The power grid 100 may correspond to one or more electrical nodes that pass through the power system of the ship. The power grid 100 may be a set or network of one or more electrical cables that can provide power to the load components by forming one or more electrical nodes.

In the embodiment of FIG. 1, the power grid 100 forms an alternating current (AC) grid to which an AC voltage is applied. However, inventive concept is not limited to this case, and the power grid 100 may also form, for example, a direct current (DC) grid to which a DC voltage is applied.

The generators G1 through Gn may be connected to the power grid 100 and may supply electricity to the power grid 100. The generators G1 through Gn may be, for example, diesel generators capable of generating a large electric power of 200 KW or more. Alternatively, the generators may be gas engine generators which are internal combustion engines that use gas fuel such as coal gas, generated gas, liquefied gas (LPG), or natural gas. Each generator may generate an AC voltage having a specific voltage level and frequency and may be self-regulated to maintain the specific voltage level and frequency. For example, each diesel generator may self-regulate the amount of fuel consumed in order to provide an AC voltage of 440 V and 60 Hz. Accordingly, the voltage and frequency provided to the power grid 100 can be maintained at 440 V and 60 Hz.

The load components 600 may be connected to the power grid 100 and may be powered by the power grid 100 to perform their corresponding functions.

If the load of the power grid 100 rises as a result of the load components 600 consuming a lot of power, the amplitude of the AC voltage of the power grid 100 may be reduced, or the frequency of the AC voltage of the power grid 100 may be reduced. In this case, it can be interpreted that the load of the power grid 100 has been increased. Thus, the generators G1 through Gn may be regulated to provide an operating load corresponding to the increased load. Specifically, when the load of the power grid 100 increases, the generators G1 through Gn may increase the amount of fuel consumed, thereby increasing the amplitude and frequency of the AC voltage to a specific level and frequency, for example, to 440 V and 60 Hz. Accordingly, the operating load provided to the power grid 100 can be increased.

In addition, the generators G1 through Gn may receive a generator control signal CS_G from the outside and produce power in response to the received generator control signal CS_G, thereby adjusting the operating load corresponding to the amount of power supplied to the power grid 100.

That is, in the embodiment of the inventive concept, the generators G1 through Gn may operate in an external regulating manner in which the generators G1 through Gn regulate their operating load according to the external generator control signal CS_G. Alternatively, the generators G1 through Gn may maintain, in an external regulating manner, the amount of power load generated independently of the momentary voltage fluctuation of the power grid network 100.

The load components 600 in the ship may be various applied devices and appliances that are connected to the power system of the ship to perform their functions. The load components 600 may be connected to the power grid 100 via a transformer, and the transformer may step down or up the voltage (e.g., 440 V) of the power grid 100 to the operating voltage of each load component and provide the stepped-down or up voltage to the load components 600.

In the ship according to the embodiment of the inventive concept, the load components 600 may include, but are not limited to, an onboard device/appliance load L0 and a plurality of thrusters L1 through Lm.

The onboard device/appliance load L0 may be a common device/appliance operated by using electricity in the ship, such as a control system, a household appliance, a light, etc.

The thrusters L1 through Lm may be combinations of electric motor and a screw that provide auxiliary propulsion and are installed in addition to a main propeller for operating the ship. For example, the thrusters L1 through Lm may be bow thrusters located at the bow of the ship to provide propulsion in a direction perpendicular to the longitudinal direction of the ship or may be azimuth thrusters that can provide propulsion in all directions.

The ship according to the embodiment of the inventive concept may be a ship performing a dynamic positioning operation. That is, in order to maintain its balance against dynamic changes in its position and angle over time, the ship according to the embodiment of the inventive concept may control its dynamic positioning operation by using the thrusters L1 through Lm which are auxiliary power units.

Since the operation of the thrusters L1 through Lm for the dynamic positioning operation of the ship is intended to cope with dynamic changes in the unspecified position and angle of the ship, it can cause momentary fluctuations in the average load consumed in the slip during an unspecified time period.

In order to cope with such momentary fluctuations in the load applied to the power grid 100 in the ship, the generators G1 through Gn of the ship must have a sufficient margin for the load that can be supplied. For example, in order to supply a load equal to or greater than an average load L_A consumed in the ship, one generator should be able to supply power sufficiently greater than the average load L_A, or an additional generator should maintain a power generation state in which it supplies a minimum load. For example, even if the maximum load that can be supplied by a first generator (e.g., G1) among the generators G1 through Gn is equal to or greater than the average load L_A consumed in the ship, a second generator (e.g., G2) needs to maintain a standby state in consideration of the margin for the operating load of the thrusters operated for dynamic positioning during an unspecified time period. Here, the second generator G2 should maintain a power generation state in which it supplies a relatively low load compared to its capacity, and this can cause a reduction in the fuel efficiency of the generator.

However, the ship according to the embodiment of the inventive concept can actively cope with momentary load fluctuations by using the high-capacity battery 400 instead of the generator maintaining the standby state.

The high-capacity battery 400 may be connected to the power grid 100 via DC-to-AC transformer or an AC-to-DC transformer and may serve as an auxiliary power supply unit for the power system of the ship. The high-capacity battery 400 may be charged with power supplied from the power grid 100 and may be discharged to supply power to the power grid 100.

The high-capacity battery 400 may be a lithium ion battery or a super capacitor. In addition, the high-capacity battery 400 may be one or more of the lithium ion battery and the super capacitor loaded in an ISO container.

The high-capacity battery 400 may be repeatedly charged or discharged to maintain or follow a preset charge level. For example, the high-capacity battery 400 may be self-regulated to be charged when discharged to below a preset lower limit and may be self-regulated to be discharged when charged to above a preset upper limit. In addition, the high-capacity battery 400 may be self-regulated to be charged or discharged so as to follow a preset target charge or discharge value that varies over time.

Furthermore, the high-capacity battery 400 may switch to a charging state or a discharging state in response to an external battery control signal CS_B. For example, the high-capacity battery 400 starts to be charged when receiving the battery control signal CS_B corresponding to a charge start signal. The high-capacity battery 400 may be controlled in an external regulating manner to start to be discharged when receiving the battery control signal CS_B corresponding to a discharge start signal.

The generators G1 through Gn may transmit generator load information L_G about whether each of the generators G1 through Gn is in operation and about the operating load of each of the generators G1 through Gn to an external destination, for example, to the external controller 200. In addition, the high-capacity battery 400 may transmit information about a current charge level, the number of charge/discharge cycles, charge and discharge durations, etc. to an external destination, for example, to the external controller 200.

The controller 200 may control whether each of the generators G1 through Gn will be operated and the operating load of each of the generators G1 through Gn by providing the generator control signal CS_G to each of the generators. In addition, the controller 200 may control whether the high-capacity battery will be charged or discharged by providing the battery control signal CS_B to the high-capacity battery 400. Also, the controller 200 may be connected to the power grid 100 via a sensor and may detect the voltage of the power grid 100 by using the sensor.

Specifically, in the ship according to the embodiment of the inventive concept, the controller 200 may receive the generator load information L_G from the generators G1 through Gn, calculate a current load L_C and the average load L_A by detecting the voltage of the power grid 100, and control the operating load of each generator and the charging/discharging of the high-capacity battery based on the calculated current load L_C and the calculated average load L_A.

More specifically, the controller 200 may control an operating load L_G1 of at least the first generator (e.g., G1) to correspond to the average load L_A consumed by the power system. That is, the generator may be controlled to handle the average load L_A. In addition, the controller 200 may discharge the high-capacity battery 400 during a time period in which the current load L_C currently consumed by the power system is greater than the average load L_A consumed by the power system and charge the high-capacity battery 400 during a time period in which the current load L_C is smaller than the average load L_A. That is, the high-capacity battery 400 may be controlled to handle a difference load between the current load L_C and the average load L_A.

As used herein, the current load L_C refers to the total amount (e.g., arithmetic sum) of load applied to the power grid 100 at a current time. In addition, the average load L_A refers to the average of loads applied to the power grid 100 during at least a certain period of time before the current time. The average may be a value obtained by dividing the total amount of load during a predetermined time period by time. The average may be a simple average or a weighted average.

Exemplary elements of the controller 200 according to the embodiment of the inventive concept will now be described in detail with reference to FIG. 2.

Figure 2:
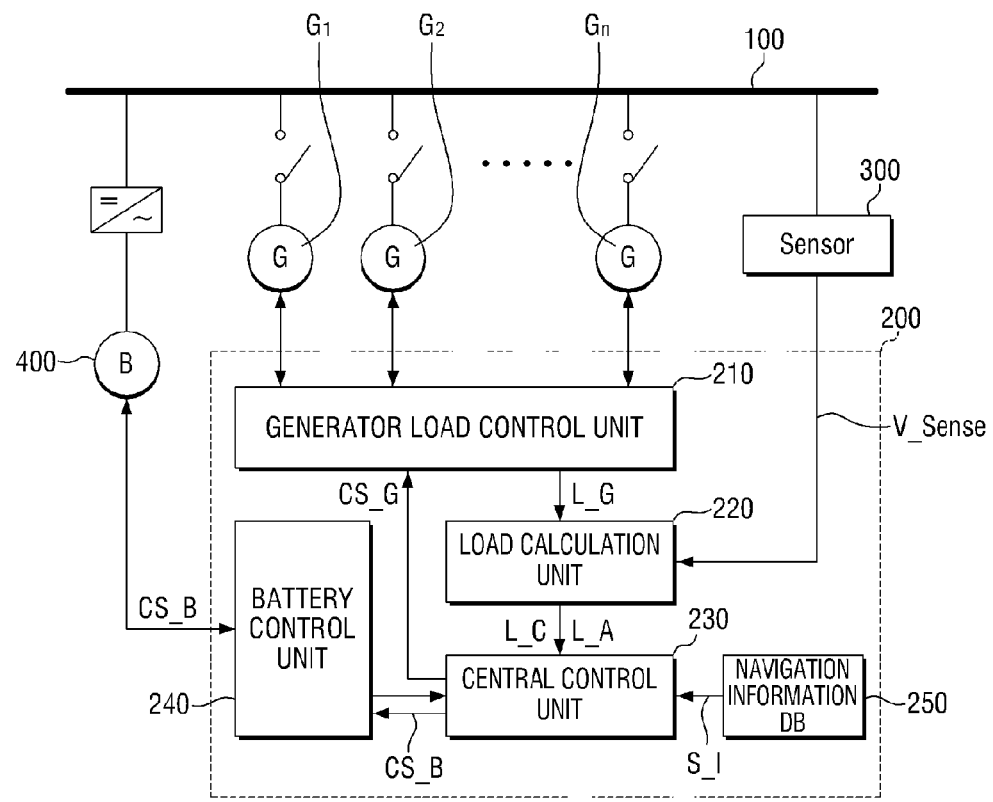
FIG. 2 is a detailed block diagram illustrating exemplary elements of a controller in the power system of the ship according to the embodiment of FIG. 1.

FIG. 2 is a detailed block diagram illustrating exemplary elements of the controller 200 in the power system of the ship according to the embodiment of FIG. 1.

In the ship according to the embodiment of the inventive concept, the controller 200 may include a generator load control unit 210, a load calculation unit 220, a central control unit 230, a battery control unit 240, and a navigation information database (DB) 250.

The generator load control unit 210 may be an interface which transmits the generator control signal CS_G to the generators G1 through Gn and receives the generator load information L_G from the generators G1 through Gn.

The generator load control unit 210 may transmit the received generator load information L_G to the load calculation unit 220. In addition, the generator load control unit 210 may receive the generator control signal CS_G from the central control 230 and transmit the generator control signal CS_G to the generators G1 through Gn. Each of the generators G1 through Gn may regulate its operation and operating load in response to the external generator control signal CS_G.

A sensor 300 may sense the voltage (e.g., voltage level, amplitude, frequency, etc.) of the power grid 100 and transmit a sensed value V_Sense to the load calculation unit 220.

The load calculation unit 220 may calculate the total operating load of the generators G1 through Gn, the average load L_A in the ship, the current load L_C, the difference between the current load L_C and the total operating load, etc.

The load calculation unit 220 may determine the total operating load currently produced by the generators G1 through Gn based on, for example, the received generator load information L_G.

In addition, the load calculation unit 220 calculates the average load L_A and the current load L_C based on the sensed value V_Sense (i.e., voltage level, amplitude, frequency, etc.) of the power grid 100. Then, the load calculation unit 220 may provide the calculated average load L_A and the calculated current load L_C to the central control unit 230.

The load calculation unit 220 may monitor a deviation (hereinafter, referred to as an "amplitude deviation") between the amplitude of the voltage of the power grid 100 and a specific amplitude or a deviation (hereinafter, referred to as a "frequency deviation") between the frequency of the voltage of the power grid 100 and a specific frequency. Here, each of the specific amplitude and the specific frequency may be, for example, a value corresponding to the total operating load currently produced by the generators G1 through Gn. As described above, the current load L_C corresponds to the arithmetic sum of all loads connected to the power grid 100 at the current time. Therefore, the "amplitude deviation" may correspond to the difference between the current load L_C and the total operating load. Likewise, the "frequency deviation" may correspond to the difference between the current load L_C and the total operating load.

For example, if the current load L_C is greater than the total operating load currently produced by the generators G1 through Gn, the amplitude or frequency of the voltage detected from the power grid 100 may be reduced. Conversely, if the current load L_C is smaller than the total operating load currently produced by the generators G1 through Gn, the amplitude or frequency of the voltage detected from the power grid 100 may be increased.

In summary, the load calculation unit 220 may calculate the difference between the current load L_C and the total operation load based on the "amplitude deviation" and the "frequency deviation."

In addition, the load calculation unit 220 may calculate the average load L_A by averaging random samples of the current loads L_C, which have been calculated before the current time, over an arbitrary time period. The average load L_A should be understood as representing the average tendency of the fluctuating current loads L_C. However, it should be interpreted that the average load L_A can be judged in consideration of not only the average of the current loads L_C at previous times but also the tendency of the current loads L_C at the previous and current times.

The battery control unit 240 transmits the battery control signal CS_B to the high-capacity battery 400. The battery control unit 240 may be an interface that receives information about the current charge level of the high-capacity battery 400, the number of charge/discharge cycles, the charge and discharge durations, etc., from the high-capacity batter 400.

The battery control unit 240 may transmit the information received from the high-capacity battery 400 to the central control unit 230. In addition, the battery control unit 240 may receive the battery control signal CS_B from the central control unit 230 and transmit the battery control signal CS_B to the high-capacity battery 400. The high-capacity battery 400 may switch to the charging or discharging state in response to the external battery control signal CS_B.

The central control unit 230 may provide the generator control signal CS_G to each of the generators G1 through Gn through the generator load control unit 210. Therefore, the central control unit 230 can control whether each of the generators will be operated and the operating load of each of the generators. In addition, the central control unit 230 may provide the battery control signal CS_B to the high-capacity battery 400 through the battery control unit 240. Therefore, the central control unit 230 can control whether the high-capacity battery 400 will be charged or discharged.

Specifically, the central control unit 230 may determine whether to operate each of the generators G1 through Gn and the operating load of each of the generators G1 through Gn based on the current load L_C and the average load L_A received from the load calculation unit 220 and may generate the generator control signal CS_G corresponding to the determination result. In addition, the central control unit 230 may determine the charging/discharging timing of the high-capacity battery 400 based on the current load L_C and the average load L_A and may generate the battery control signal CS_B corresponding to the determination result.

More specifically, the central control unit 230 may control the operating load of of at least one generator (e.g., G1) to correspond to the average load L_A. That is, when the average load L_A is maintained constant or increases or decreases at a gentle speed, the central control unit 230 may generate the generator control signal CS_G for controlling the operating load corresponding to the load produced by the generators G1 through Gn to be equal or close to the average load L_A and provide the generator control signal CS_G to the generators G1 through Gn.

In addition, the central control unit 230 may compare the current load L_C with the average load L_A and provide the battery control signal CS_B for controlling the high-capacity battery to be discharged to the high-capacity battery 400 during a time period in which the current load L_C is greater than the average load L_A. Conversely, the central control unit 230 may provide the battery control signal CS_B for controlling the high-capacity battery 400 to be charged to the high-capacity battery during a time period in which the current load L_C is smaller than the average load L_A.

That is, the central control unit 230 may control the operating load produced by the generators G1 through Gn to follow the average load L_A and compensate for fluctuations in the current load L_C caused by the thrusters at an unspecified time by charging or discharging the high-capacity battery. This will be described in more detail later with reference to FIGS. 3 through 7.

The navigation information DB 250 may be a DB in which sailing schedule information S_I of the ship is recorded.

The navigation information DB 250 may provide the sailing schedule information S_I of the ship to the central control unit 230, and the central control unit 230 may set an additional charging or discharging time period of the high-capacity battery 400 in consideration of the sailing schedule of the ship.

Figure 3:
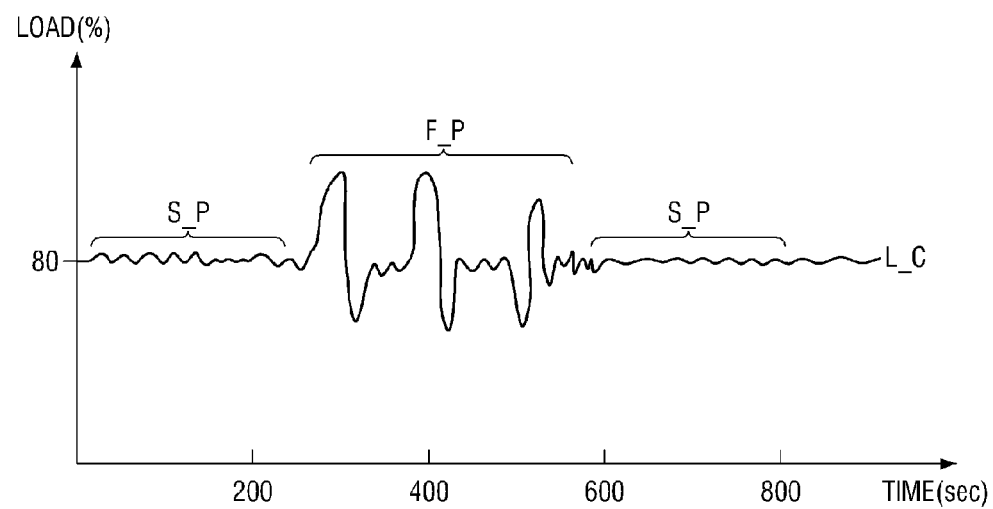
FIG. 3 is a graph illustrating the current load of a ship during sailing.
Figure 4:
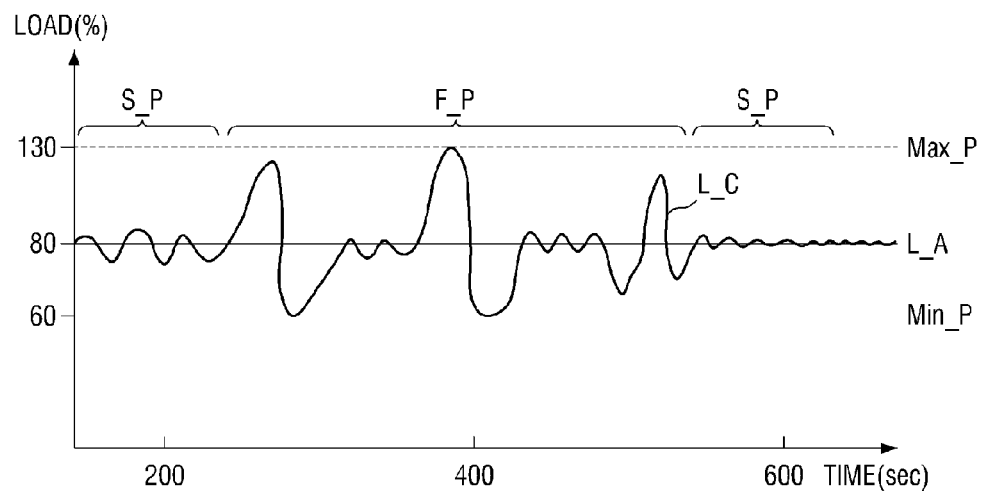
FIG. 4 is an enlarged view of a portion of the graph of FIG. 3.

FIG. 3 is a graph illustrating the current load of a ship during sailing. FIG. 4 is an enlarged view of a portion of the graph of FIG. 3.

Referring to FIGS. 3 and 4, the load consumed in a ship during sailing is generally expected to be maintained constant without a significant fluctuation or to increase or decrease at a low slope over time. Therefore, as illustrated in FIGS. 3 and 4, the graph of the current load L_C of the ship with respect to time may have a smoothing section S_P maintained at a constant value.

For reference, in FIGS. 3 and 4, the vertical axis represents load (%) based on the assumption that the maximum operating load that can be produced by one of the generators G1 through Gn is 100%, and the horizontal axis represents time in seconds.

When high-capacity loads such as the thrusters are used for, e.g., dynamic positioning during sailing, the load consumed by the ship may fluctuate greatly. Thus, as illustrated in FIGS. 3 and 4, the graph of the current load L_C of the ship with respect to time can have a fluctuating section F_P for a certain period of time.

In FIGS. 3 and 4, a maximum value Max_P of the current load L_C in the fluctuating section is 130%, and a minimum value Min_P of the current load L_C in the fluctuating section is 60%. In addition, the average load L_A of the ship during sailing is 80%.

That is, in the above example, the average load A of the ship during sailing is 80%, which is within the range of the operating load that can be produced by at least one generator. Therefore, it may be efficient for only one generator to produce power during the smoothing section S_P and provide the produced power to the power system.

However, when the ship operates the thrusters for, e.g., dynamic positioning, the load may fluctuate. To cope with such load fluctuations, the generators G1 through Gn should have a margin for the load that can be supplied.

That is, as illustrated in FIGS. 3 and 4, when the maximum value Max_P of the current load L_C in the fluctuating section F_P is 130%, the operating load (100%) of one generator is insufficient to cope with fluctuations in the current load L_C of the fluctuating section. Therefor an additional power source for supplying additional power to make up for the shortfall may be required.

The easiest approach to supply additional power in the fluctuating section F_P may be to operate an additional generator. This will be further described below with reference to FIG. 5.

In another approach proposed herein to supply additional power in the fluctuating section F_P, the operating load of a generator and the charging/discharging of the high-capacity battery may be controlled based on the average load L_A and the current load L_C. This will be further described below with reference to FIG. 6.

Figure 5:
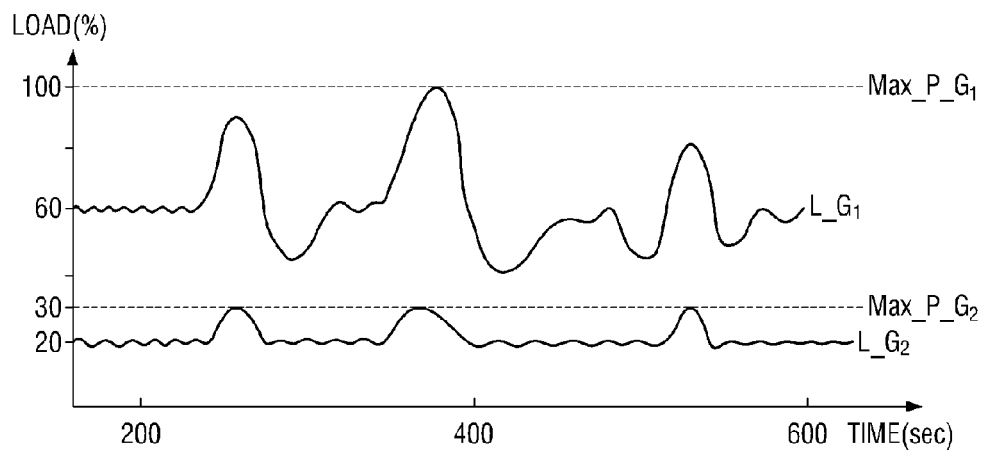
FIG. 5 is a graph illustrating the operating load when an additional generator is operated for the current load of the graph of FIG. 4.
Figure 6:
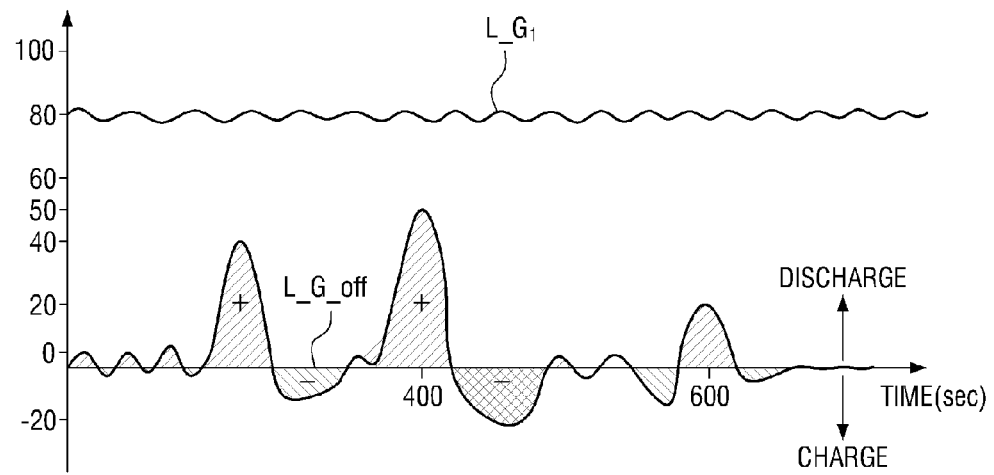
FIG. 6 is a graph illustrating, for the current load of the graph of FIG. 4, the operating load of a generator and the charge/discharge load of a high-capacity battery in the ship according to the embodiment of the inventive concept.
Figure 7:
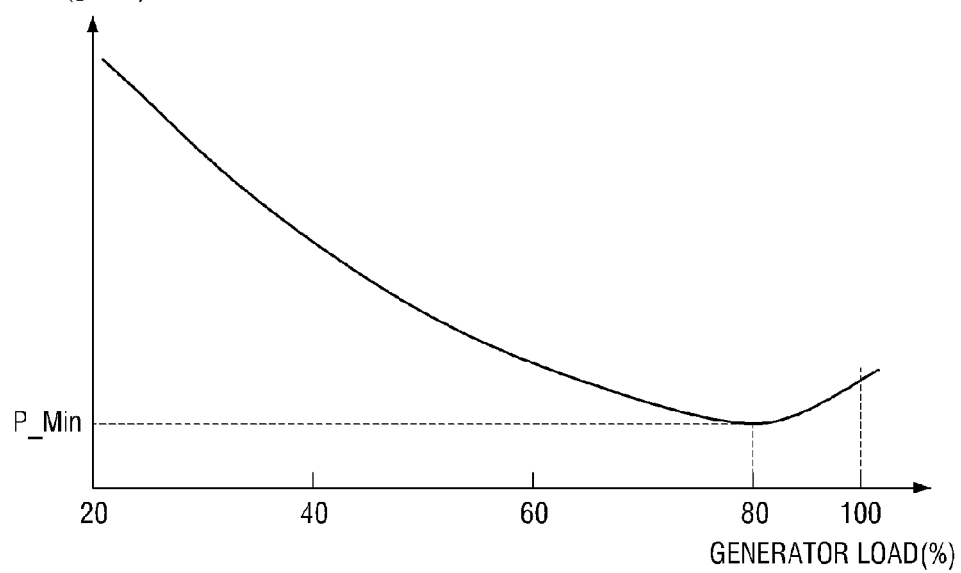
FIG. 7 is a graph illustrating fuel consumption per unit produced power for the operating load of one generator.

FIG. 5 is a graph illustrating the operating load when an additional generator for the current load of the graph of FIG. 4. FIG. 6 is a graph illustrating, for the current load of the graph of FIG. 7, the operating load of a generator and the charge/discharge load of the high-capacity battery in the ship according to the embodiment of the inventive concept. FIG. 7 is a graph illustrating fuel consumption per unit produced power for the operating load of one generator.

First, referring to FIG. 5, for example, two generators G1 and G2 may be used. The sum of the operating load L_G1 of the first generator G1 and an operating load L_G2 of the second generator G2 may correspond to the current load L_C.

Since there may be a considerable time delay until a generator (G1 or G2) is started to supply power, when an additional generator is to be used to cope with fluctuations in the current load L_C in the fluctuating section the additional generator needs to be always kept turned on. That is, as illustrated in FIG. 5, the second generator G2 may maintain an operating load of, e.g., 20% in order to cope with fluctuations in the current load L_C in the fluctuating section.

Here, the first generator G1 may have an operating load of 60% in the smoothing section, and the operating load of the first generator G1 may repeatedly increase or decrease in the fluctuating section F_P. In addition, the first generator G1 may have a maximum operating load Max_P_G1 of close to 100% at a point where the current load L_C of the fluctuating section F_P has a maximum value. The second generator G2 may maintain an operating load of 20% as a standby state and may have a maximum operating load Max_P_G2 of about 30% at a point where the current load L_C of the fluctuating section is maximum.

Referring to FIG. 7, in general, fuel consumption per unit produced power (g/kwh) gradually decreases as the operating load produced by one diesel generator increases and has a minimum value at a point where the operating load is about 80%.

That is, a maximum efficiency load is an operating load at a point where fuel efficiency is maximum, and the fuel efficiency of the diesel generator increases as the operating load of the diesel generator is closer to the maximum efficiency load.

Referring back to FIG. 5, the first generator G1 has an operating load of about 60% in the smoothing section S_P, and the second generator G2 has an operating load of about 20% in the smoothing section S_P. That is, although the average load L_A of the power system in the ship is 80% as illustrated in FIG. 4, the second generator should maintain an operating load of about 20% in order to cope with fluctuations in the current load L_C in the fluctuating section. Accordingly, the first generator maintains an operating load of 60%. That is, if an operating load that can be supplied by one generator (e.g., G1) is supplied using two generators G1 and G2, the operating load of each of the generators G1 and G2 may be reduced. In other words, as apparent from FIG. 7, the fuel efficiency of the generators G1 and G2 is reduced.

In particular, the second generator G2 maintaining the standby state may have an operating load of about 20% which is the lowestperating load for keeping the second generator G2 turned on. As apparent from FIG. 7, the operating load of about 20% leads to the lowest fuel efficiency.

On the other hand, referring to FIG. 6, the controller 200 of the ship according to the embodiment of the inventive concept may calculate the average load L_A and the current load L_C and control the operating load L_G1 of the first generator G1 to correspond to the average load L_A. That is, as illustrated in FIG. 6, when the average load L_A is 80%, the first generator G1 may have an operating load L_G1 of 80%, which is maintained in both the smoothing section S_P and the fluctuating section F_P.

In addition, the controller 200 may control the high-capacity battery 400 to be discharged during a time period in which the current load L_C is greater than the average load L_A and to be charged during a time period in which the current load L_C is smaller than the average load L_A.

That is, as illustrated in FIG. 6, the operating load L_G1 of the first generator G1 is maintained at about 80% which is close to the average load L_A. During a time period (+) in which the current load L_C is greater than the average load L_A, the high-capacity battery may be discharged to supply power to the power system. During a time period (−) in which the current load L_C is smaller than the average load L_A, the high-capacity battery may be charged with power supplied from the power system.

That is, when the average load L_A is smaller than the maximum efficiency load of one G1 of the generators, only the generator G1 may be operated, and the other generator G2 may not be operated. The average load L_A may be handled by the generator G1, and the remaining load may be handled by the high-capacity battery. Therefore, there is no need for the generator G2 to be operated at a low operating load of about 20%.

Therefore, for the average load L_A smaller than the maximum operating load of one generator, the ship according to the embodiment of the inventive concept can secure a sufficient margin for any load fluctuations without operating an additional generator and can avoid a reduction in fuel efficiency due to the use of the additional generator.

Further, in the ship according to the embodiment of the inventive concept, at least one generator (e.g., G1) has an operating load corresponding to the average load L_A. Therefore, the operating load of the generator ay be constant over time or may fluctuate at a low slope over time. This can prevent the rapid acceleration or deceleration of the generator, thereby suppressing the aging of the generator.

In particular, when the ship performs a dynamic positioning operation, it may be very effective for a generator to handle the average load L_A and for the high-capacity battery to handle the difference load between the current load L_C and the average load L_A. The dynamic positioning operation is performed to enable a ship such as a drillship to maintain its position under the influence of tidal currents, wind and waves, so that the ship can anchor in a marine working area. This is because, empirically, during the dynamic positioning operation, the average load L_A is constant, and a momentary load is frequently generated by sudden tidal currents, wind, waves, etc. In addition, during the dynamic positioning operation, the high-capacity battery may use a super capacitor. This is because, during the dynamic positioning operation, the energy storage capacity does not have to be large, but the momentary output should be large.

In addition, the ship according to the embodiment of the inventive concept may have a generator (G1) whose operating load corresponds to the average load L_A measured in advance during normal sailing. Therefore, during sailing, the operating load of at least one generator may be close to the maximum efficiency load, thus improving the fuel efficiency of the ship.

Figure 8:
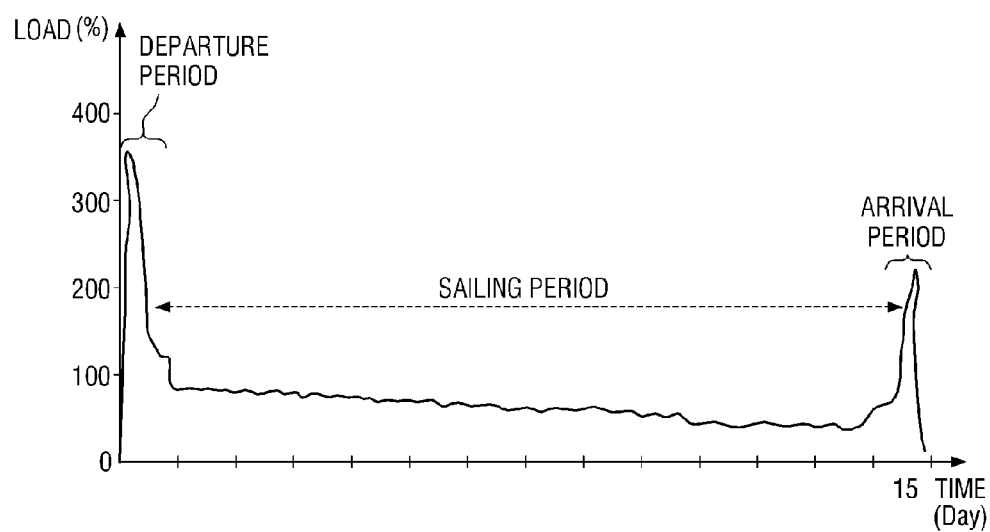
FIG. 8 is a graph illustrating fluctuations in load over time in an exemplary sailing schedule of the ship according to the embodiment of the inventive concept.
Figure 9:
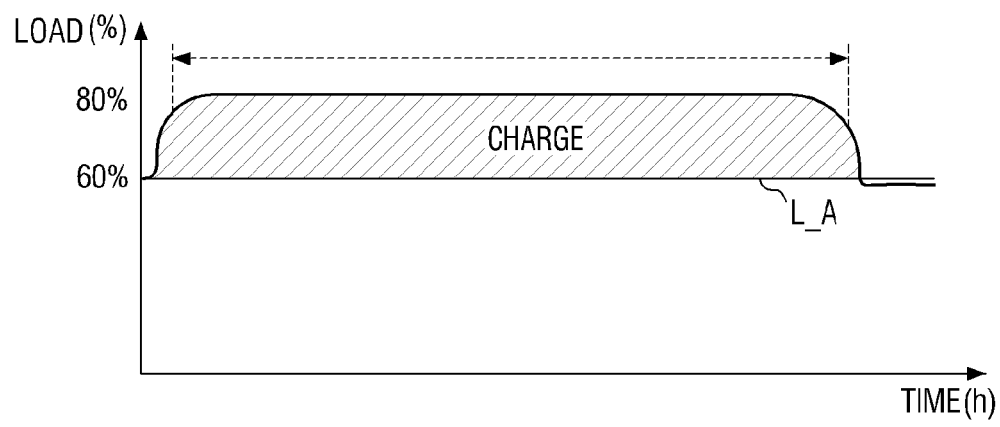
FIG. 9 illustrates a charging period set by the controller of the ship according to the embodiment of the inventive concept by referring to the sailing schedule of FIG. 8.
Figure 10:
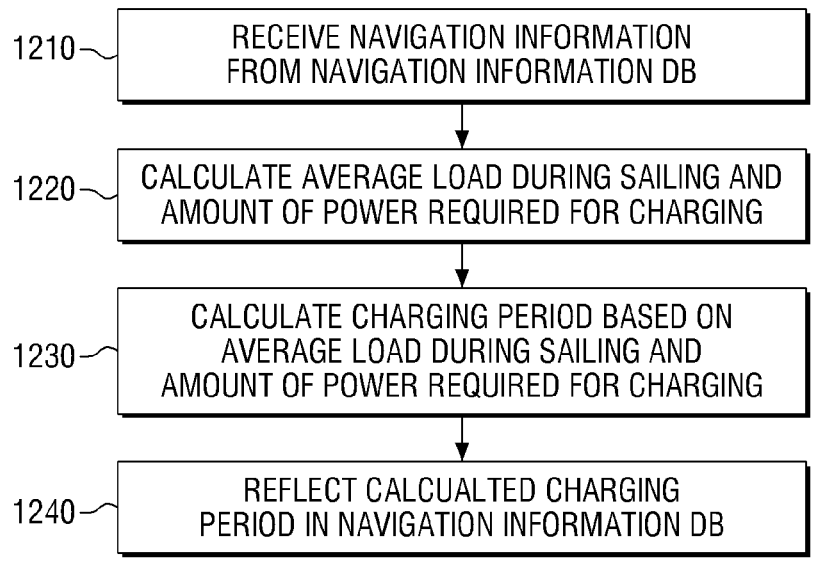
FIG. 10 is a flowchart illustrating a process in which the controller of the ship according to the embodiment of the inventive concept sets a charging period by referring to the sailing schedule information of FIG. 8.

FIG. 8 is a graph illustrating fluctuations in load over time in an exemplary sailing schedule of the ship according to the embodiment of the inventive concept. FIG. 9 illustrates a charging period set by the controller of the ship according to the embodiment of the inventive concept by referring to the sailing schedule of FIG. 8. FIG. 10 is a flowchart illustrating a process in which the controller of the ship according to the embodiment of the inventive concept sets a charging period by referring to the sailing schedule information of FIG. 8.

In FIG. 8, the horizontal axis is the time axis, and the unit is day. In addition, in FIG. 8, the vertical axis represents the total load consumed by the power system of the ship, and the unit is %. Here, 100% represents the maximum load that can be produced by one generator of the ship.

Referring to FIG. 8, a general sailing schedule of a ship can be divided into a departure period, a sailing period, and an arrival period based on the fluctuation of the load consumed.

During the departure period and the arrival period, a plurality of thruster L1 through Lm (see FIG. 1) in the ship may all be operated especially for departure and berthing. Therefore, the load consumed by the ship may increase sharply. During the sailing period, a relatively constant and low power load may be required.

Since a lot of power is consumed during the departure and arrival periods, the ship needs to fully charge the high-capacity battery before the arrival period.

Referring to FIGS. 9 and 10, the controller 200 according to the embodiment of the inventive concept may set an additional charging/discharging time period of the high-capacity battery based on the sailing schedule information S_I in the navigation information DB 250, information about the charge level of the battery, and the average load L_A.

Specifically, in FIG. 9, an arbitrary time period before arrival is illustrated. Here, the average load L_A of the power system in the ship is 60%.

The central control unit 230 of the controller 200 may receive navigation information from the navigation information DB 250 (operation 1210). At this time, the controller 200 may calculate a period of time left before arrival based on the navigation information.

Then, the controller 200 may calculate the average load during sailing and the amount of power required for charging (operation 1220). Specifically, the controller 200 may calculate the amount of power required to fully charge the battery based on information about the charge level of the battery.

Next, the controller 200 may calculate a charging period based on the average load L_A during sailing and the amount of power required for charging (operation 1230). Specifically, the controller 200 may determine a charging period, which is required to fully charge the battery when at least one generator is operated at the maximum efficiency load, based on the calculated amount of power required to fully charge the battery.

Next, the controller 200 performs additional charge/discharge control by reflecting the calculated charging period in the navigation information DB 250 (operation 1240). Here, the controller 200 may charge the high-capacity battery by controlling at least one generator to operate at the maximum efficiency load at a time when the determined charging period is not greater than the calculated remaining period of time before arrival.

Therefore, the ship according to the embodiment of the inventive concept can charge the high-capacity battery for arrival and departure by operating a generator at the maximum efficiency load, which can improve the fuel efficiency required to charge the high-capacity battery.

Hereinafter, the power generation control and power generation control aspects of generators according to another embodiment of the inventive concept when the average load L_A exceeds the maximum operating load or the maximum efficiency load will be described with reference to FIGS. 11 and 12.

Figure 11:
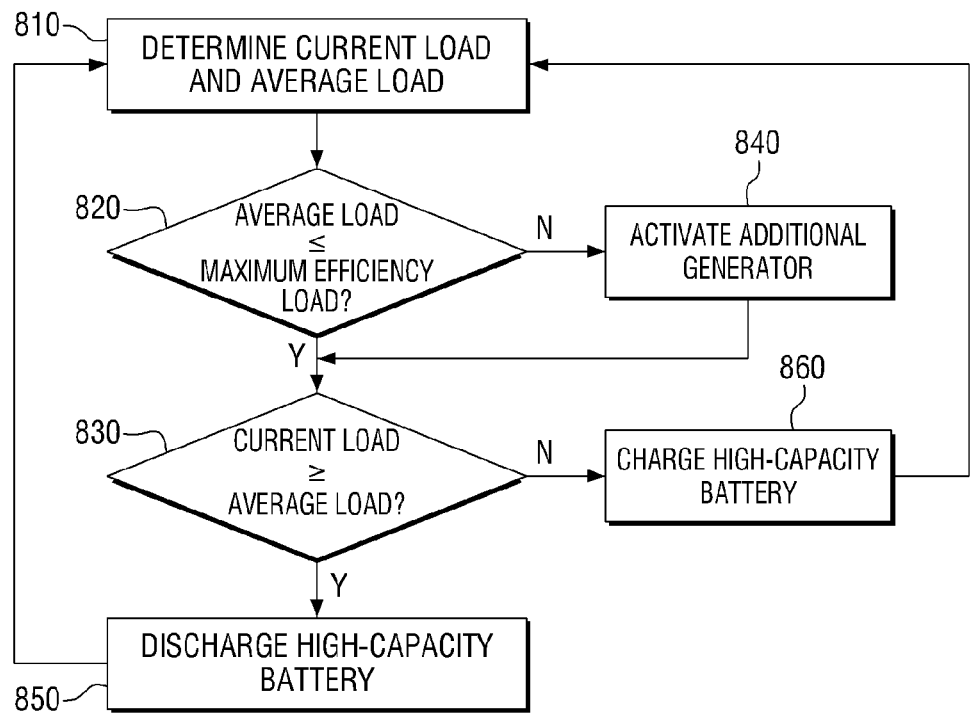
FIG. 11 is a flowchart illustrating the charge/discharge control process of a controller of a ship according to another embodiment of the inventive concept.

FIG. 11 is a flowchart illustrating the charge/discharge control process of a controller 200 of a ship according to another embodiment of the inventive concept.

Referring to FIG. 11, the controller 200 (see FIG. 2) may determine an average load L_A and a current load L_C based on generator load information L_G and a voltage of a power grid 100 (operation 810).

The controller 200 may then compare the average load L_A with a maximum efficiency load (e.g., 80%) (operation 820). The value (80%) of the maximum efficiency load may vary according generator. In the embodiment of FIG. 11, the controller 200 compares the magnitude of the average load L_A with the magnitude of the maximum efficiency load. However, in another embodiment, the controller 200 may compare the average load L_A with the maximum operating load of at least one generator.

If the maximum efficiency load is smaller than the average load L_A, that is, if the average load L_A is greater than the maximum efficiency load ("N"), the controller 200 activates an additional generator (operation 840).

If the maximum efficiency load is equal to or greater than the average load L_A ("Y") or if the additional generator has been activated, the controller 200 compares the magnitude of the current load L_C with the magnitude of the average load L_A (operation 830).

Next, if the current load L_C is not greater than the average load L_A ("N"), the controller 200 charges a high-capacity battery (operation 860). If the current load L_C is greater than or equal to the average load L_A ("Y"), the controller 200 discharges the high-capacity battery (operation 850).

Then, the charge/discharge control of the controller 200 may be continuously repeated from operation 810.

Figure 12:
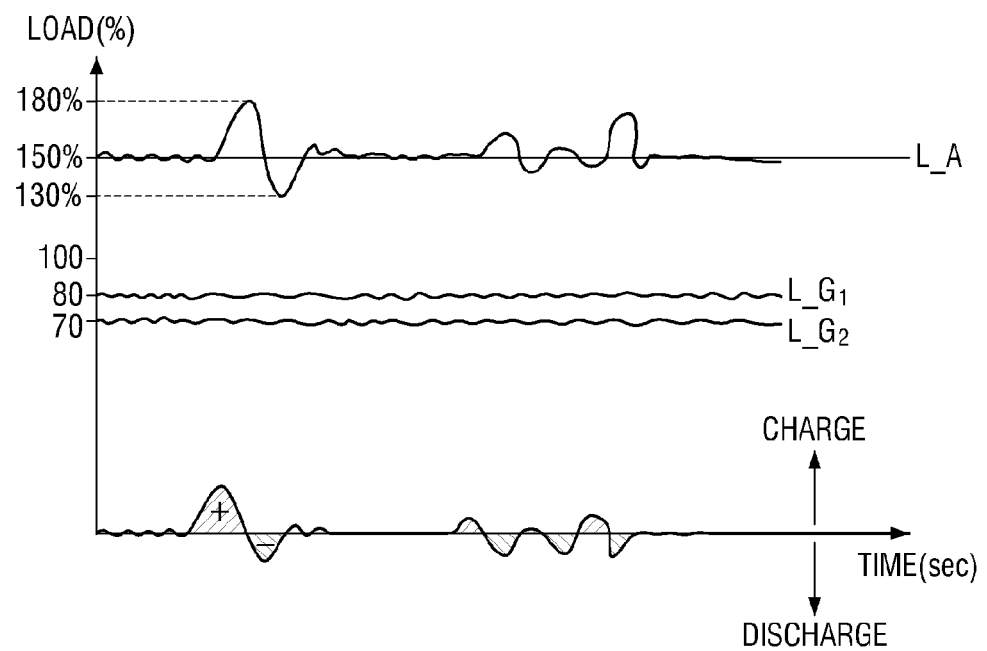
FIG. 12 is a graph illustrating fluctuations in the operating load of a plurality of generators of a ship according to another embodiment of the inventive concept according to fluctuations in the load of the ship over time.

FIG. 12 is a graph illustrating fluctuations in the operating load of a plurality of generators G1 through Gn of a ship according to another embodiment of the inventive concept according to fluctuations in the load of the ship over time.

In FIG. 12, the total load of the ship fluctuates over time between a maximum load of 180% and a minimum load of 130% with an average load L_A of about 150%.

Referring to FIG. 12, when the average load L_A is greater than the maximum efficiency load of a first generator G1, the controller 200 maintains an operating load L_G1 of the first generator G1 at the maximum efficiency load of the first generator G1. The controller 200 may control the first generator G1 and a second generator G2 such that the sum of the operating load L_G1 of the first generator G1 and an operating load L_G2 of the second generator G2 corresponds to the average load L_A.

For example, the controller 200 may maintain the operating load L_G1 of the first generator G1 at the maximum efficiency load (about 80%) of the first generator G1, independently of fluctuations in the current load L_C over time.

In addition, the controller 200 may maintain the operating load L_G2 of the second generator G2 at, for example, 70% independently of fluctuations in the current load L_C over time, such that the sum of the operating load L_G1 of the first generator G1 and the operating load L_G2 of the second generator G2 corresponds to the average load L_A.

Alternatively, the controller 200 may control the first generator G1 and the second generator G2 such that the operating load of each of the first generator G1 and the second generator G2 corresponds to the maximum efficiency load. For example, the controller 200 may control both the first generator G1 and the second generator G2 to operate at an operating load of 80%.

Alternatively, the controller 200 may control the operating load L_G1 of the first generator G1 and the operating load L_G2 of the second generator G2 to be equal to each other. That is, when the average load L_A is 150%, the operating load L_G1 of the first generator G1 and the operating load L_G2 of the second generator G2 may each be 75%. When each generator has the same operating load, the operating load will hereinafter be referred to as a "split efficiency load."

Here, the controller 200 may discharge a high-capacity battery 400 (see FIG. 2) when the current load L_C is greater than the average load L_A and charge the high-capacity battery 400 when the current load L_C is smaller than the average load L_A.

Therefore, in another embodiment of the inventive concept, at least one generator (e.g., G1) may produce power at the maximum efficiency load or the split efficiency load, and another generator (e.g., G2) may produce power at a load close to the maximum efficiency load or at the split efficiency load. Therefore, the fuel efficiency of the generators in the ship can be improved.

Furthermore, in another embodiment of the inventive concept, at least one generator produces power at the maximum efficiency load, and the sum of the operating loads of the at least one generator (e.g., G1) and another generator (e.g., G2) is maintained at the average load L_A, that is, the sum of the operating loads is maintained constant or has a low slope over time. Therefore, the rapid acceleration or deceleration of the generators can be prevented, thereby suppressing the aging of the generators.

Figure 13:
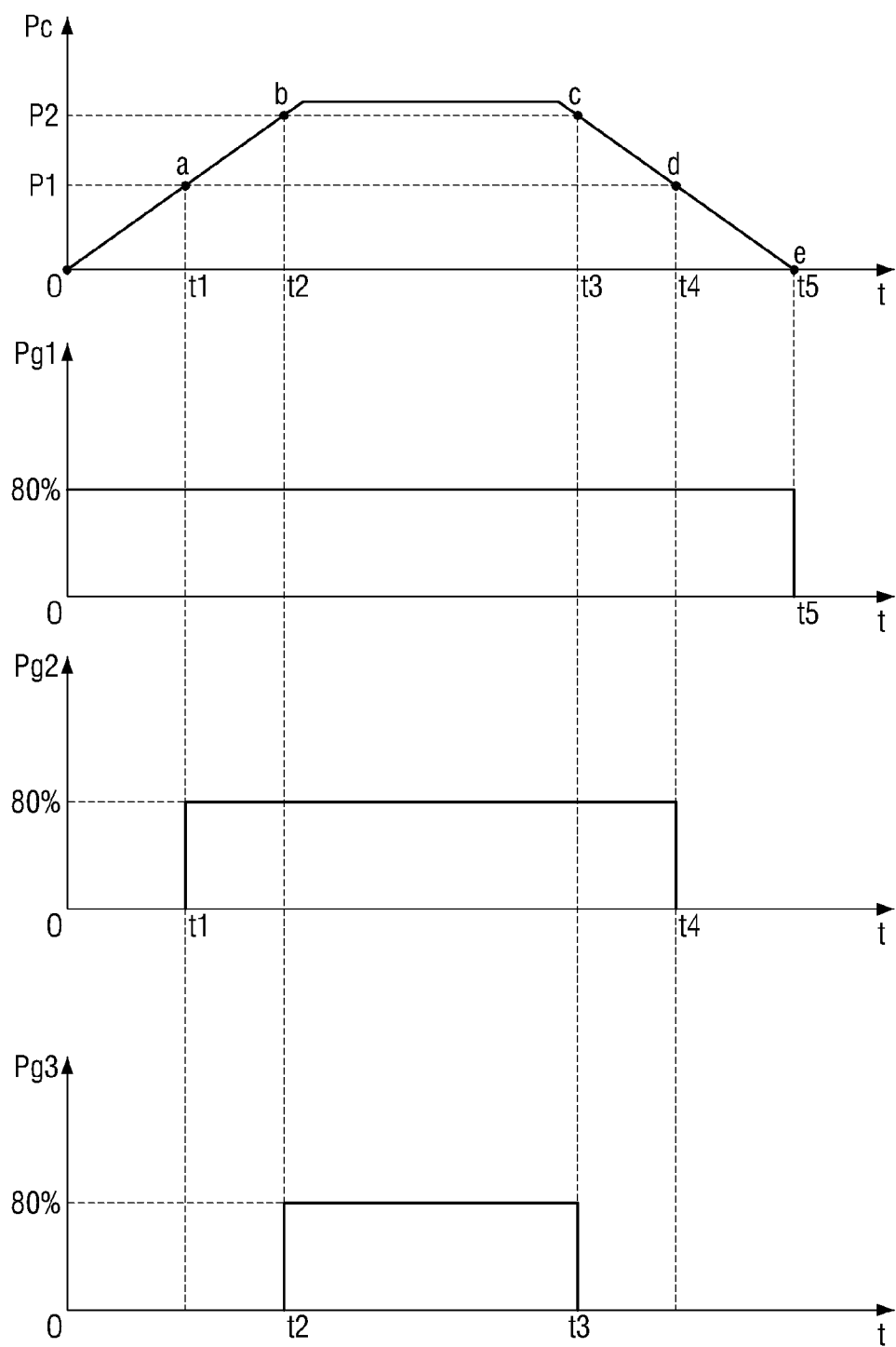
FIGS. 13 through 16 illustrate power graphs according to embodiments of the inventive concept.
Figure 14:
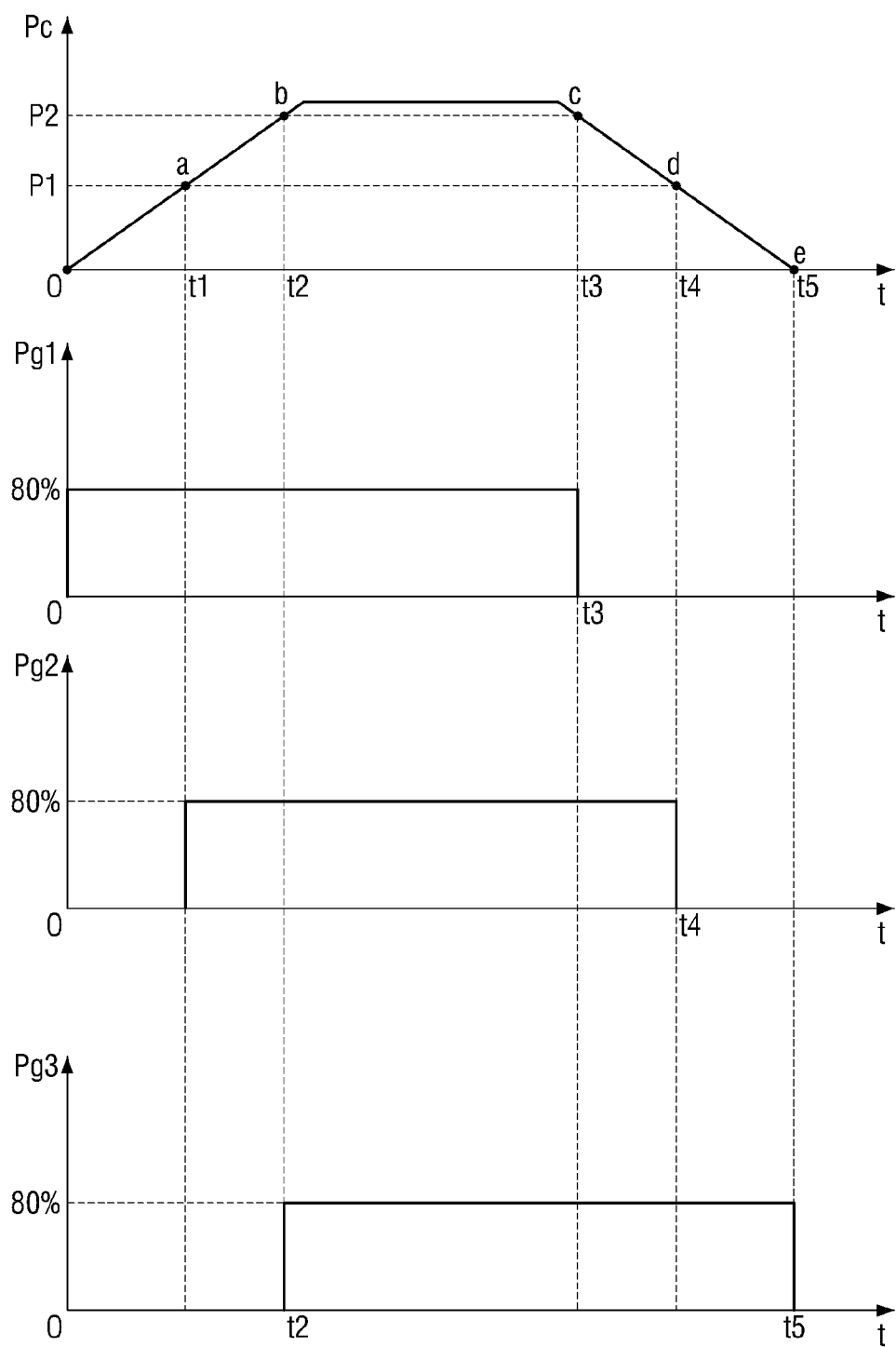
Figure 15:
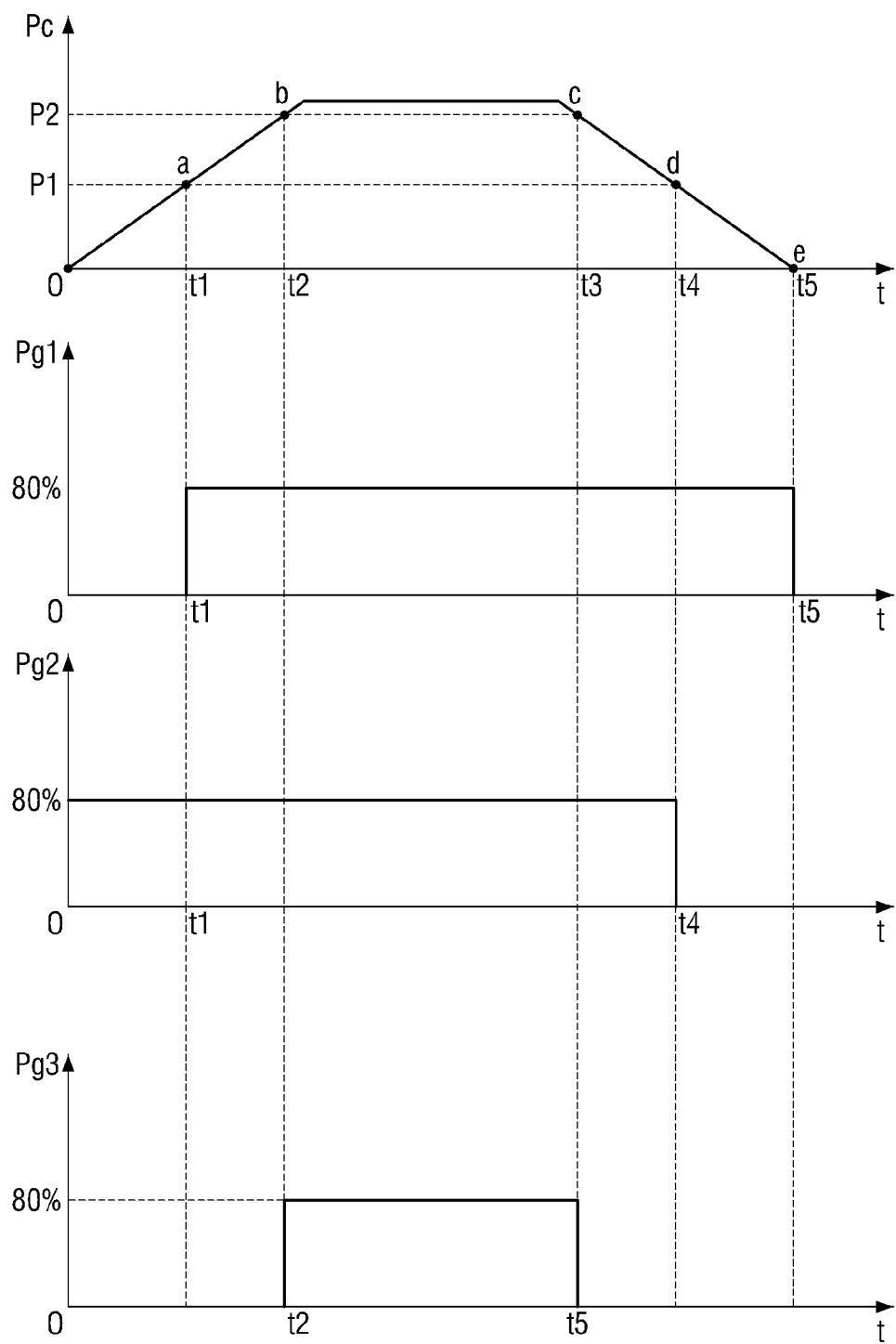

FIGS. 13 through 15 illustrate the sequential operation of generators according to the fluctuation of an average load Pc.

Referring to FIG. 13, the average load Pc fluctuates like o→a→b→c→d→e, and generators Pg1 through Pg3 are sequentially started and stopped according to the average load Pc.

When the average load Pc starts to increase from the point o, the first generator Pg1 starts to operate. At this time, the first generator Pg1 may operate at an operating load of a preset magnitude. In FIG. 13, the first generator Pg1 operates at an operating load of 80%. In this case, a portion of the power produced by the first generator Pg1 may remain, and the remaining power may be accumulated in the high-capacity battery 400.

When the average load Pc exceeds a first reference value P1 at the point the second generator Pg2 starts to operate. The second generator Pg2 may also operate at an operating load of a preset magnitude. In FIG. 13, the second generator Pg2 operates at an operating load of 80%. In this case, a portion of the power produced by the second generator Pg2 may remain, and the remaining power may be accumulated in the high-capacity battery 400.

When the average load Pc exceeds a second reference value P2 at the point b, the third generator Pg3 starts to operate. The third generator Pg3 may also operate at an operating load of a preset magnitude. In FIG. 13, the third generator Pg3 operates at an operating load of 80%.

Here, the operating load of 80% of each of the first generator Pg1, the second generator Pg2 and the third generator Pg3 may be the maximum efficiency load described above.

From the point b, the average load Pc is maintained without a large fluctuation. Then, when the average load Pc becomes less than the second reference value P2 at the point c, the third generator Pg3 stops operating.

The average load Pc continuously decreases from the point c. Then, when the average load Pc becomes less than the first reference value P1 at the point d, the second generator Pg2 stops operating. Here, a portion of the power produced by the second generator Pg2 between the point c and the point d may remain, and the remaining power may be accumulated in the high capacity battery 400.

From the point d, the average load Pc continuously decreases. Then, when the average load Pc becomes zero at the point e, the first generator Pg1 stops operating. Here, a portion of the power produced by the first generator Pg1 between the point d and the point e may remain, and the remaining power may be accumulated in the high-capacity battery 400.

The starting and stopping of each generator may be performed according to the scheduling result of the central control unit 230.

That is, only the first generator Pg1 is scheduled to operate when the average load Pc is less than the first reference value P1. The first generator Pg1 and the second generator Pg2 are scheduled to operate when the average load Pc is less than the second reference value P2 while exceeding the first reference value P1. The first generator Pg1, the second generator Pg2 and the third generator Pg3 are scheduled to operate when the average load Pc exceeds the second reference value P2.

Since each of the generators Pg1 through Pg3 is induced to operate at the maximum efficiency load, the efficiency can be maximized. In addition, since the remaining power is accumulated in the battery 400, it is possible to easily cope with momentary load fluctuations.

In FIG. 13, the generators are stopped in an order reverse to the order which the generators are started. That is, in FIG. 13, the first generator Pg1 which has been started first is stopped last, and the third generator Pg3 which has been started last is stopped first.

Alternatively, as illustrated in FIG. 14, the generators may be stopped in the order in which the generators are started or according to the operation time of the generators.

Referring to FIG. 14, the average load Pc fluctuates like o→a→b→c→d→e, and the generators Pg1 through Pg3 are sequentially started and stopped according to the average load Pc.

That is, the first generator Pg1 which has been started first may be stopped first, and the third generator Pg3 which has been started last may be stopped last.

Alternatively, the generators may be started and stopped in an arbitrary order as illustrated in FIG. 1.

Referring to FIG. 15, the average load Pc fluctuates like o→a→b→c→d→e, and the generators Pg1 through Pg3 are started and stopped in an arbitrary order.

The generators Pg1 through Pg3 may be started in an arbitrary order of the second generator Pg2→the first generator Pg1→the third generator Pg3 and may be stopped in an arbitrary order of the third generator Pg3→the second generator Pg2→the first generator Pg1 regardless of the order in which the generators Pg1 through Pg3 were started.

As described above, the central control unit 230 may schedule the operation of a plurality of generators based on the operation start order, the operation duration, or the arbitrarily set order. However, these scheduling criteria are mere examples, and the scheduling can be performed in more various ways.

In FIGS. 13 through 15, all generators 500 included in a grid operate at operating loads of the same magnitude. However, the operating loads of some or all of the generators can be set differently. Alternatively, the operating loads of all generators 500 may be set equally to correspond to the magnitude of the average load Pc.

Figure 16:
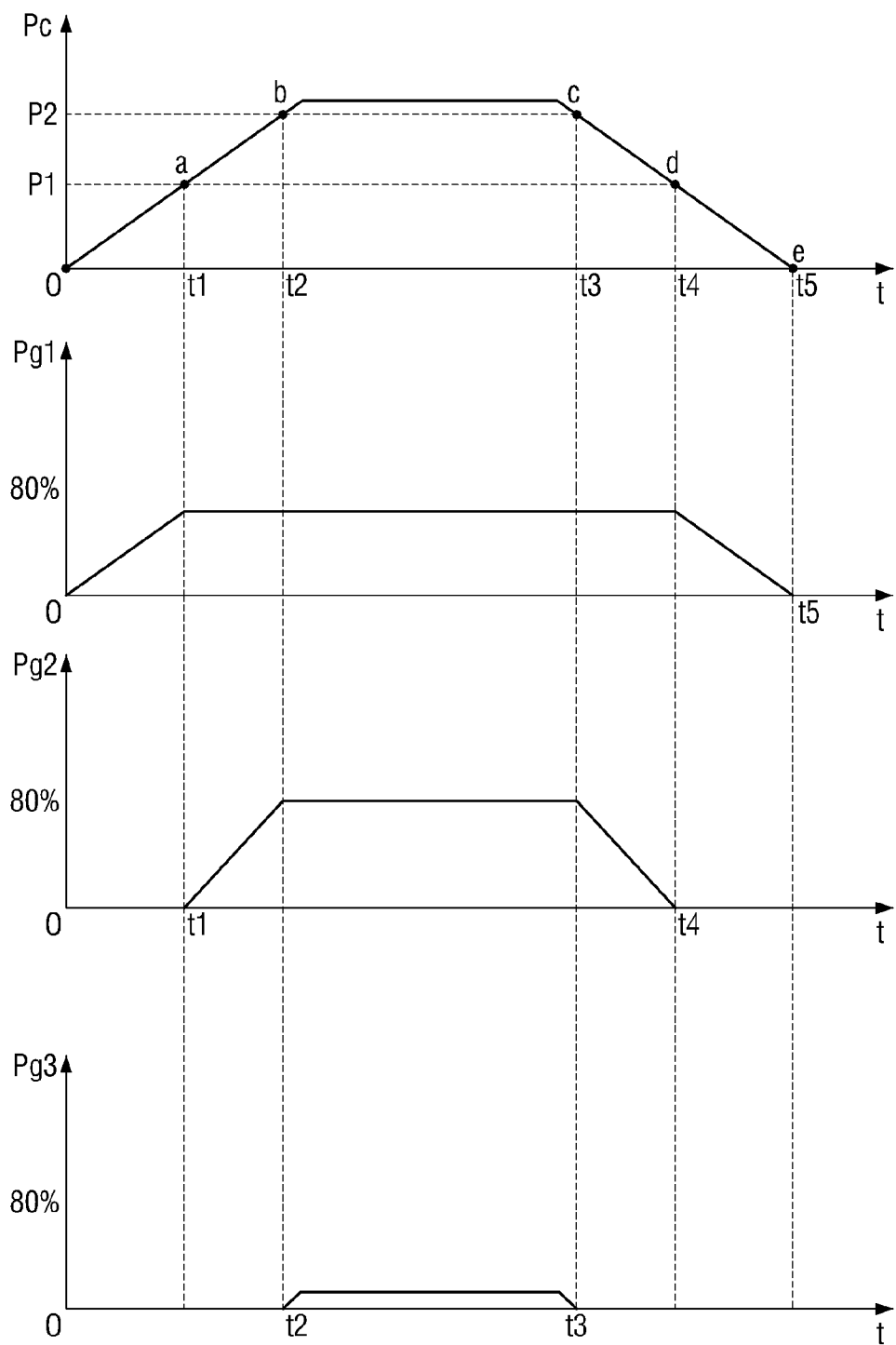

Referring to FIG. 16, the operating load of each of the generators Pg1 through Pg3 may no longer increase once reaching the maximum efficiency load (e.g., 80%) after the start of each of the generators Pg1 through Pg3.

Specifically, the average load Pc fluctuates like o→a→b→c→d→e, and the generators Pg1 through Pg3 are sequentially started and stopped according to the average load Pc.

When the average load Pc starts to increase from the point o, generator Pg1 starts to operate. At this time, the operating load of the first generator Pg1 increases according to the average load Pc.

When the average load Pc exceeds a first reference value P1 at the point a, the operating load of the first generator Pg1 no longer increases. The first generator Pg1 maintains a maximum efficiency load of 80%. That is, the first generator Pg1 does not operate above the maximum efficiency load. At this time, the second generator Pg2 starts to operate. The operating load of the second generator Pg2 increases according to the average load Pc.

When the average load Pc exceeds a second reference value P2 at the point b, the third generator Pg3 also starts operate. The operating load of the second generator Pg2 no longer increases. The second generator Pg2 maintains a maximum efficiency load of 80%. That is, the second generator Pg2 does not operate above the maximum efficiency load. The operating load of the third generator Pg3 may be adjusted according to the average load Pc.

When the average load Pc starts to decrease continuously from the point c, the third generator Pg3 stops operating. The operating load of the second generator Pg2 also starts to decrease according to the average load Pc.

In addition, when the average load Pc becomes less than the first reference value P1 at the point d, the second generator Pg2 stops operating. The operating load of the first generator Pg1 also starts to decrease according to the average load Pc.

When the average load Pc becomes zero at the point e, the first generator Pg1 also stops operating.

The above starting and stopping of each of the generators may be performed according to the scheduling result of the central control unit 230.

According to the above method, the generators Pg1 through Pg3 may not be able to operate in a maximum efficiency section while the average load Pc is increasing. However, above a specific reference value (P1 or P2), at least some (Pg1 and Pg2) of the generators can operate in the maximum efficiency section. For example, when the average load Pc is maintained for a long time around the specific reference value (P1 or P2), at least some (Pg1 and Pg2) of the generators can operate in the maximum efficiency section. In addition, a momentary load excluding the average load Pc may be handled by the high-capacity battery.

Figure 17:
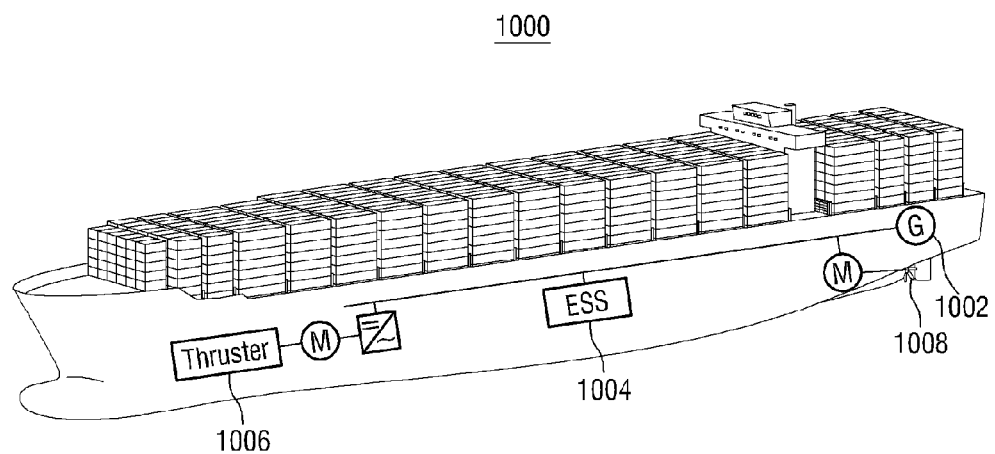
FIG. 17 illustrates a container ship according to an embodiment of the inventive concept.

FIG. 17 illustrates a container ship according to an embodiment of the inventive concept.

Referring to FIG. 17, a ship and a power management system of the ship according to an embodiment of the inventive concept can be applied to the container ship 1000. Specifically, elements of the ship and the power management system of the ship according to the embodiment of the inventive concept can be applied to a thruster 1006 located at the bow, a high-capacity battery 1004 located around the center of the hull, a generator 1002 and a propeller 1008 located at the stern. Alternatively, an element such as the high-capacity battery 1004 may be placed on a container located on the deck.

Figure 18:
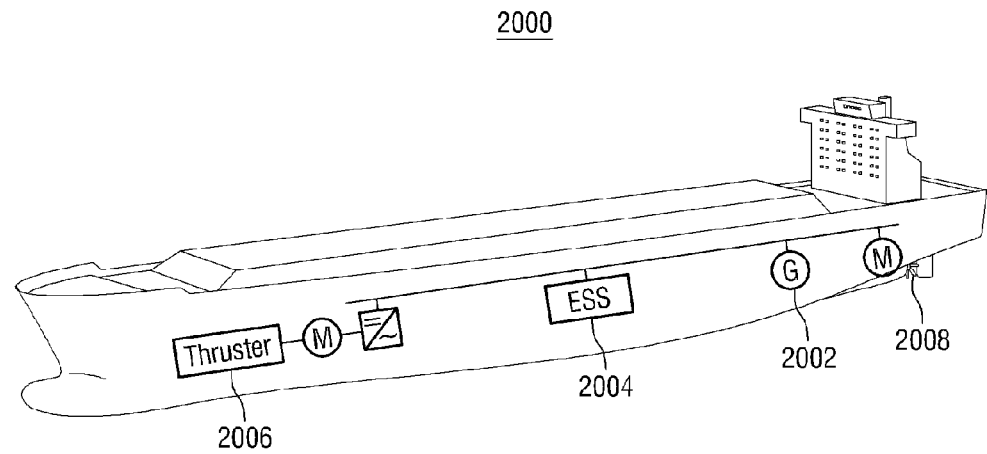
FIG. 18 illustrates an LNG carrier according to an embodiment of the inventive concept.

FIG. 18 illustrates an LNG carrier according to an embodiment of the inventive concept.

Referring to FIG. 18, a ship and a power management system of the ship according to an embodiment of the inventive concept can be applied to the LNG carrier 2000. Specifically, elements of the ship and the power management system of the ship according to the embodiment of the inventive concept can be applied to a thruster 2006 located at the bow, a high-capacity battery 2004 located around the center of the hull, a generator 2002 and a propeller 1008 located at the stern. In addition, the power produced by the generator 2002 and the power discharged from the high-capacity battery 2004 may be supplied to a load such as a thermostat for controlling the temperature of LNG tank or a compressor for re-liquefying BOG vaporized in the LNG tank.

Therefore, the ship and the power management system and method of the ship according to the embodiment of the inventive concept can be applied to various ships (such as the container ship 1000 and the LNG carrier 2000) capable of producing power and supplying the produced power to a load. The ships shown in FIGS. 17 and 18 are only examples to which the ship and the power management system and method of the ship according to the embodiment of the inventive concept can be applied. The arrangement of specific elements of the ship and the power management system of the ship can be modified in various ways.

While the inventive concept has been particularly shown and described with reference to exemplary embodiments thereof, it will be understood by those of ordinary skill in the art that various changes in form and detail may be made It is claimed:

1. A ship comprising:
   a power grid;
   one or more generators which are connected to the power grid and supply electricity to the power grid;
   a high-capacity battery which is connected to the power grid and charged with electricity supplied from the power grid or discharged to supply power to the power grid;
   a plurality of load components which are connected to the power grid; and
   a controller which receives generator load information from the generators, calculates a current load and an average load by sensing a voltage of the power grid, and controls the generators to handle the average load and the high-capacity battery to handle a difference load between the current load and the average load,
   wherein, when the average load is smaller than a maximum efficiency load of one of the generators, only the generator is operated, and the other generators are not operated.

2. The ship of claim 1, wherein the controller controls the high-capacity battery to be discharged during a time period in which the current load is greater than the average load and controls the high-capacity battery to be charged during a time period in which the current load is smaller than the average load.

3. The ship of claim 1, wherein, during a dynamic positioning operation of the ship, the average load is handled by the generator, and the difference load is handled by the high-capacity battery.

4. The ship of claim 3, wherein the high-capacity battery comprises a super capacitor.

5. The ship of claim 1, wherein the controller monitors a first deviation between an amplitude of the voltage of the power grid and a specific amplitude or a second deviation between a frequency of the voltage of the power grid and a specific frequency and further calculates a difference between the current load and a total operating load of the generators based on the first deviation or the second deviation.

6. The ship of claim 1, wherein the controller comprises:
   a generator load control unit which transmits a generator control signal to the generators and receives the generator load information from the generators;
   a load calculation unit which receives the generator load information from the generator load control unit and calculates the average load and the current load based on the voltage of the power grid detected by a sensor;
   a battery control unit which transmits a battery control signal to the high-capacity battery and receives information about a current charge level of the high-capacity battery, the number of charge/discharge cycles, charge and discharge durations, etc. from the high-capacity battery; and
   a central control unit which controls whether each of the generators will be operated and an operating load of each of the generators by providing the generator control signal to each of the generators through the generator load control unit and controls whether the high-capacity battery will be charged or discharged by providing the battery control signal to the high-capacity battery through the battery control unit.

7. The ship of claim 6, wherein the controller further comprises a navigation information database (DB) in which sailing schedule information of the ship is recorded, and the central control unit receives the sailing schedule information of the ship from the navigation information DB and sets an additional charging time period of the high-capacity battery.

8. The ship of claim 7, wherein the central control unit receives navigation information from the navigation information DB, calculates a period of time left before arrival based on the received navigation information, calculates an average load during sailing and the amount of power required for charging, calculates a charging period, which is required to fully charge the high-capacity battery when at least one of the generators are operated at the maximum efficiency load, based on the calculated average load during sailing and the calculated amount of power required for charging, and controls the additional charging of the high-capacity battery by recording the calculated charging period in the navigation information DB.

9. The ship of claim 1, wherein the controller sets a charging time period of the high-capacity battery based on the sailing schedule information of the ship.

10. The ship of claim 1, wherein the generators comprise diesel generators or gas engine generators which are internal combustion engines that use gas fuel such as coal gas, generated gas, liquefied gas (LPG), or natural gas.

11. A ship comprising:
    a power grid;
    first and second generators which are connected to the power grid and supply electricity to the power grid;
    a high-capacity battery which is connected to the power grid and charged with electricity supplied from the power grid or discharged to supply power to the power grid;
    a plurality of load components which are connected to the power grid; and
    a controller which receives generator load information from the first and second generators, calculates a current load and an average load by sensing a voltage of the power grid, and controls the first and second generators to handle the average load and the high-capacity battery to handle a difference load between the current load and the average load,
    wherein the controller operates the second generator when the average load is greater than a maximum efficiency load of the first generator, and
    wherein, when the average load is smaller than a maximum efficiency load of one of the generators, only the generator is operated, and the other generators are not operated.

12. The ship of claim 11, wherein, when the average load is greater than the maximum efficiency load of the first generator, the controller maintains an operating load of the first generator at the maximum efficiency load of the first generator and controls the first generator and the second generator such that the sum of the operating load of the first generator and an operating load of the second generator corresponds to the average load.

13. The ship of claim 11, wherein, when the average load is greater than the maximum efficiency load of the first generator, the controller maintains the operating load of the first generator at the maximum efficiency load of the first generator and maintains the operating load of the second generator at a maximum efficiency load of the second generator.

14. A power management method of a ship, the method comprising:

determining an average load and a current load based on generator load information and a voltage of a power grid;
comparing the average load with a maximum efficiency load and activating an additional generator based on the comparison result; and
comparing the current load with the average load and charging or discharging a high-capacity battery based on the comparison result,
wherein, when the average load is smaller than a maximum efficiency load of one of generators, only the generator is operated, and the other generators are not operated.

* * * * *